(12) United States Patent
Gaudry et al.

(10) Patent No.: US 9,109,465 B2
(45) Date of Patent: Aug. 18, 2015

(54) GAS TURBINE ENGINE FAN CASING HAVING A FLANGE FOR FASTENING PIECES OF EQUIPMENT

(71) Applicant: SNECMA, Paris (FR)

(72) Inventors: Florian Gaudry, Paris (FR); Timothee Elisseeff, Vanves (FR); Frederic Imbourg, Yerres (FR); Guillaume Ratte, Varennes sur Seine (FR)

(73) Assignee: SNECMA, Paris (FR)

( * ) Notice: Subject to any disclaimer, the term of this patent is extended or adjusted under 35 U.S.C. 154(b) by 636 days.

(21) Appl. No.: 13/759,617

(22) Filed: Feb. 5, 2013

(65) Prior Publication Data
US 2013/0202430 A1    Aug. 8, 2013

(30) Foreign Application Priority Data

Feb. 6, 2012   (FR) ...................................... 12 51069

(51) Int. Cl.
*F01D 25/24*    (2006.01)
*F02K 3/06*    (2006.01)
*F02C 7/32*    (2006.01)

(52) U.S. Cl.
CPC ................ *F01D 25/243* (2013.01); *F02C 7/32* (2013.01); *F02K 3/06* (2013.01); *F05D 2260/31* (2013.01); *F05D 2300/603* (2013.01); *Y02T 50/672* (2013.01)

(58) Field of Classification Search
CPC ............. F01D 25/243; F05D 2260/31; F05D 2300/603; F02C 7/32; F02K 3/06; Y02T 50/672
See application file for complete search history.

(56) References Cited

U.S. PATENT DOCUMENTS

| 4,205,927 | A  | * | 6/1980  | Simmons ....................... 403/337 |
| 4,534,167 | A  | * | 8/1985  | Chee ............................ 60/226.1 |
| 7,121,758 | B2 | * | 10/2006 | McMillan et al. ............ 60/226.1 |
| 7,503,425 | B2 | * | 3/2009  | Strunk .......................... 181/214 |
| 8,851,416 | B2 | * | 10/2014 | Porte et al. ...................... 60/796 |
| 2004/0007422 | A1 |   | 1/2004  | Porte et al. |
| 2004/0255572 | A1 | * | 12/2004 | Porte ............................ 60/226.1 |
| 2007/0086854 | A1 | * | 4/2007  | Blanton .................... 29/888.02 |
| 2008/0206044 | A1 | * | 8/2008  | Porte et al. .................... 415/119 |
| 2008/0206048 | A1 |   | 8/2008  | Coupe et al. |
| 2011/0168839 | A1 |   | 7/2011  | Porte et al. |

FOREIGN PATENT DOCUMENTS

| EP | 1 369 555 A1 | 12/2003 |
| EP | 1 961 923 A2 | 8/2008 |
| FR | 2 936 223 A1 | 3/2010 |

OTHER PUBLICATIONS

French Preliminary Search Report issued Sep. 13, 2012 in corresponding French Application No. 1251069 filed Feb. 6, 2012 (with an English Translation of Categories).

* cited by examiner

*Primary Examiner* — Igor Kershteyn
(74) *Attorney, Agent, or Firm* — Oblon, McClelland, Maier & Neustadt, L.L.P.

(57) ABSTRACT

The invention provides a fan casing for a gas turbine engine, the casing having a substantially cylindrical portion that terminates at one end in an annular flange made of composite material. The flange includes at least one setback in a fraction of its thickness and at least one bolt for fastening pieces of equipment passing right through the flange in the axial direction, the bolt for fastening pieces of equipment having a head that presents a flat that is to bear flat against a rim of the setback, and a shank forming a stud for fastening pieces of equipment on the casing.

10 Claims, 2 Drawing Sheets

GAS TURBINE ENGINE FAN CASING HAVING A FLANGE FOR FASTENING PIECES OF EQUIPMENT

BACKGROUND OF THE INVENTION

The present invention relates to gas turbine engine casings, and more particularly to fan casings made of composite material for gas turbine aeroengines.

In a gas turbine aeroengine, the casing has a portion forming an air inlet sleeve with the function of defining the air inlet passage into the engine, and a portion forming a fan casing. A particular function of the fan casing is to retain debris, such as articles that have been ingested or fragments of damaged blades, which debris is projected by centrifugal force and needs to be prevented from passing through the casing and reaching other portions of the aircraft. The fan casing also supports a certain number of pieces of equipment of the engine, such as harnesses for fastening pipes conveying de-icing liquid or supports for fastening the electronic control unit of the engine.

In known manner, the air inlet sleeve and the fan casing have annular flanges at their axial ends serving in particular to mount the air inlet sleeve on the fan casing. For this purpose, the adjacent flanges of the air inlet sleeve and of the fan casing are generally fastened together by means of a plurality of nut-and-bolt type fastener systems distributed all around their circumference. The upstream flange of the fan casing is also used for fastening pieces of equipment that are supported by the casing, with this fastening also being provided by means of fastener bolts that pass through the upstream flange.

In order to enable pieces of equipment to be removed without it being necessary to begin by removing the air inlet sleeve, the flange of the air inlet sleeve generally presents festoons that receive the heads of the bolts for fastening pieces of equipment on the upstream flange of the fan casing. These festoons thus give easy access to the bolts for fastening pieces of equipment and enables them to be withdrawn it being necessary to begin by removing the air inlet sleeve.

Furthermore, it has become common practice to make the air inlet sleeve of the casing out of composite material of the fibers-and-resin type by making a fiber preform, impregnating it with a resin, and molding in order to obtain the desired shape directly.

Unfortunately, making festoons in the flange of an air inlet sleeve made out of composite material in order to be able to remove pieces of equipment leads to fibers being cut in the circumferential direction, thereby considerably weakening the circumferential mechanical strength of the air inlet sleeve.

OBJECT AND SUMMARY OF THE INVENTION

A main object of the present invention is thus to mitigate such drawbacks by proposing a fan casing in which the flange enables pieces of equipment of the engine to be removed without it being necessary to begin by removing the air inlet sleeve, and with the fastening of such pieces of equipment on the flange not requiring festoons to be made in the corresponding flange of the air inlet sleeve.

This object is achieved by a fan casing for a gas turbine engine, the casing having a substantially cylindrical portion that terminates at one end in an annular flange made of composite material, and wherein, in accordance with the invention, the flange includes at least one setback in a fraction of its thickness and at least one bolt for fastening pieces of equipment passing right through the flange in the axial direction, the bolt for fastening pieces of equipment having a head that presents a flat that is to bear flat against a rim of the setback, and a shank forming a stud for fastening pieces of equipment on the casing.

The shank of the bolt for fastening pieces of equipment forms a stud on which a piece of equipment of the engine can be fastened. The pieces of equipment can thus be installed and removed without it being necessary to begin by removing the bolt from the flange. As a result, there is no need to machine festoons in the corresponding flange of the air inlet sleeve in order to make such removal possible. When the air inlet sleeve is made of composite material, its circumferential mechanical strength is thus not degraded and a piece of equipment can be removed without it being necessary to begin by removing the air inlet sleeve.

Furthermore, the setback in the flange of the fan casing is made through only a fraction of the thickness of the flange. This results in little degradation in the circumferential mechanical strength of the fan casing. In particular, the application of tangential forces on the connection between the fan casing and the air inlet sleeve leads to the flanges sliding relative to each other. It has been found that the presence of the setback in the flange of the fan casing leads only to a very small increase in this sliding (compared with a flange not having any setbacks), with this increase remaining within proportions that are entirely acceptable.

Preferably, the flange is obtained from fiber reinforcement made up of at least two superposed layers of a fiber fabric, the thickness of the corresponding setback being substantially equal to the thickness of one layer of fiber fabric. A setback in only one thickness of fiber fabric layer makes it possible to conserve intact the other fiber fabric layers, thus further limiting any degradation in the circumferential mechanical strength of the fan casing.

Also preferably, the setback is formed in an outside face of the flange and opens out into a free end of the flange.

The fan casing may further include a nut tightened onto the shank of the bolt for fastening pieces of equipment, in order to hold the bolt on the flange. Preferably, a washer is interposed between the nut and the flange.

The invention also provides a gas turbine engine casing comprising a fan casing as defined above and an air inlet sleeve having a substantially cylindrical portion that terminates at one end in an annular flange, the air inlet sleeve being fastened to the fan casing via nut-and-bolt systems passing through the respective flanges of the fan casing and of the air inlet sleeve.

At least the flange of the air inlet sleeve may be made of composite material. Advantageously, the nut-and-bolt systems are circumferentially spaced apart from the bolts for fastening pieces of equipment. The nut-and-bolt systems may be for inserting in the respective flanges of the fan casing and of the air inlet sleeve from downstream to upstream, and the bolts for fastening pieces of equipment may be inserted in the flange of the fan casing from upstream to downstream.

The invention also provides a gas turbine aeroengine having a casing as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF THE INVENTION

Figure 1:
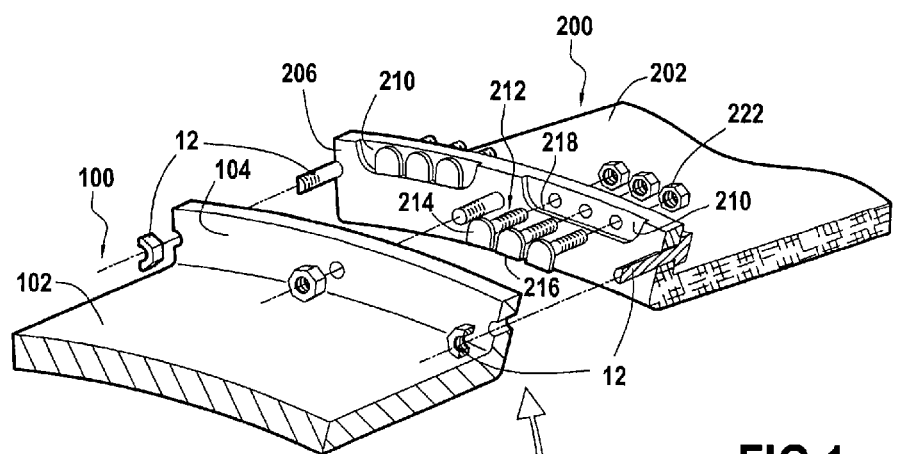
FIG. 1 is a perspective view of a casing in accordance with the invention.
Figure 1:
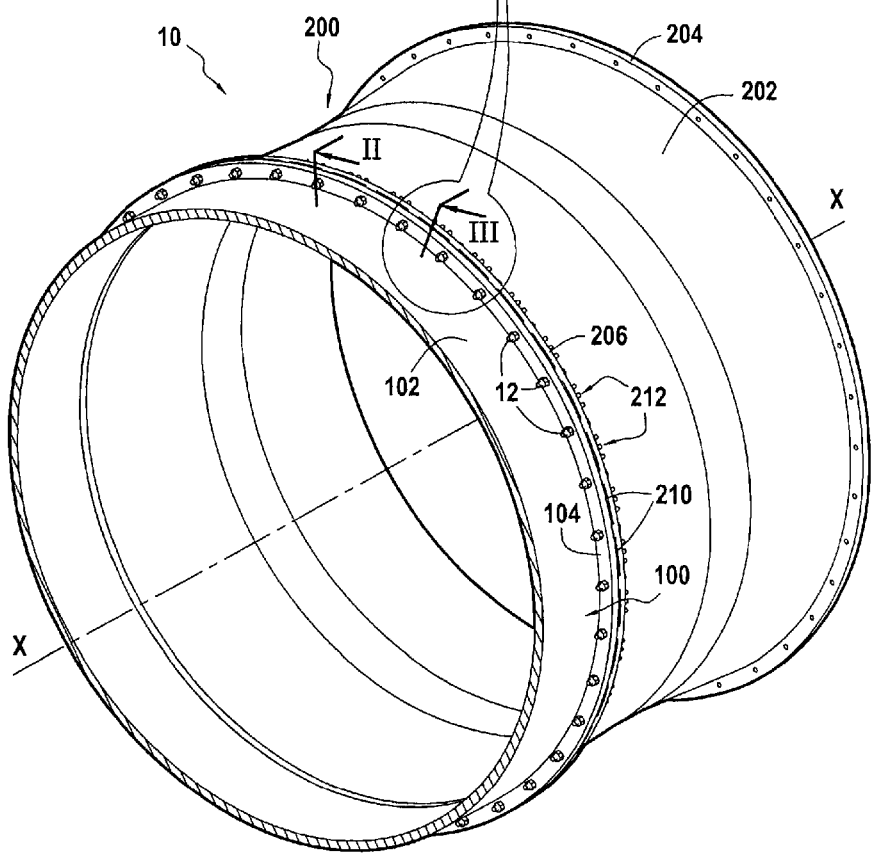

FIG. 1 shows a casing 10 within which it is possible to house a gas turbine aeroengine (not shown).

The casing 10 comprises a plurality of elements: namely in particular an air inlet sleeve 100 arranged at the inlet of the engine; and a fan casing 200 arranged downstream from the air inlet sleeve ("downstream" in the flow direction of the stream of gas passing through the engine). Each of these elements comprises a substantially cylindrical portion, respectively referenced 102 or 202, which portion is centered on a longitudinal axis X-X of the engine.

The inside surface of the cylindrical portion 102 of the air inlet sleeve 100 defines the air inlet passage into the engine. The inside surface of the cylindrical portion 202 of the fan casing serves to surround the tips of the fan blades of the engine and it incorporates or supports a retention shield (not shown).

At its downstream end, the cylindrical portion 102 of the inlet sleeve 100 is terminated by an annular flange 104. Likewise, the cylindrical portion of the fan casing is terminated at its downstream end by a downstream annular flange 204, and at its upstream end by an upstream annular flange 206.

The fan casing 200 is made of composite material by a method that consists essentially in forming fiber reinforcement with reinforcing portions that correspond to the flanges 204, 206 based on superposed layers of a fiber fabric, and in densifying the fiber reinforcement with a matrix. The reinforcement is made of fibers that may for example be carbon, glass, aramid, or ceramic fibers, and the matrix is made of polymer, e.g. epoxy, bismaleimide, or polyimide.

For this purpose, and as described for example in document EP 1 961 923, the fiber fabric is made by three-dimensional weaving and it is wound as a plurality of superposed layers on a mandrel of profile corresponding to that of the casing that is to be fabricated, the winding of the woven fabric serving to arrange yarns that are wound in the circumferential direction, thereby contributing to the desired structural properties of the fan casing.

Figure 2:
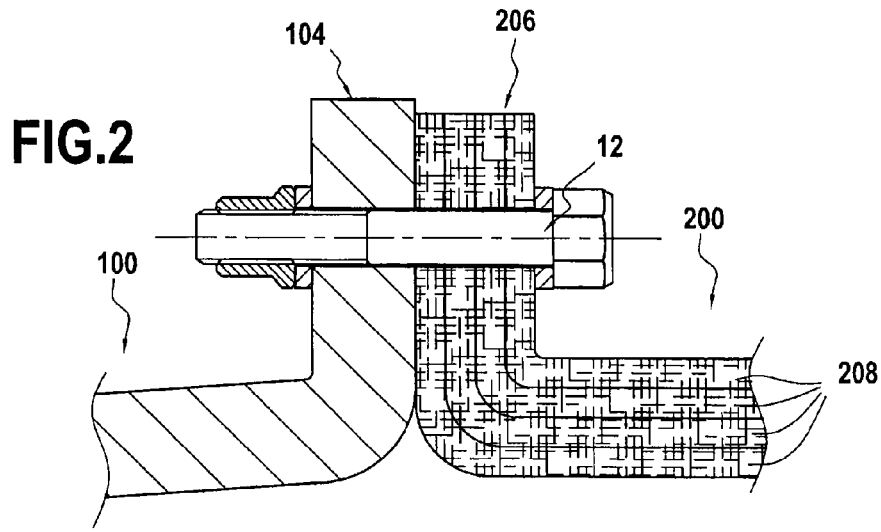
FIGS. 2 and 3 are section views of FIG. 1, respectively on section planes II and III.
Figure 3:
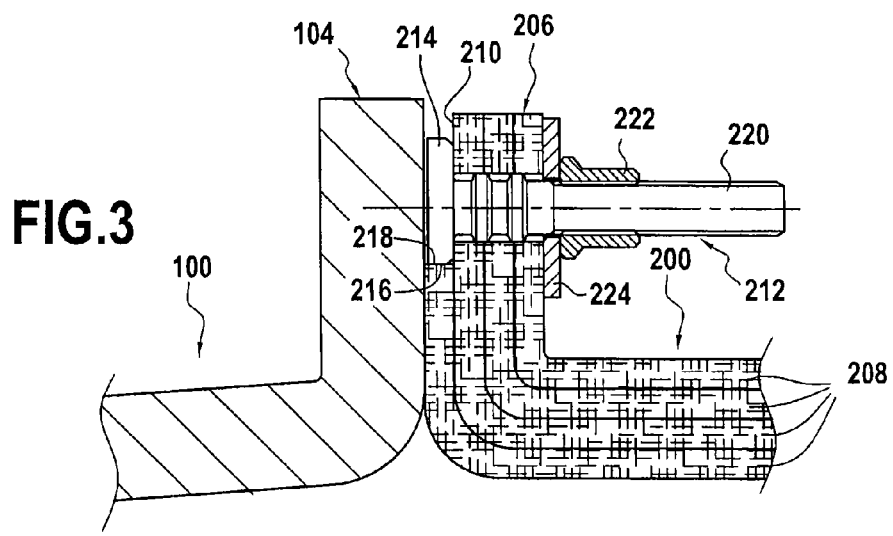

The fiber reinforcement that is to constitute the fan casing 200 is preferably made up of four superposed layers (or plies) 208 of fiber fabric (FIGS. 2 and 3).

The air inlet sleeve 100 may also be made of composite material using a fabrication method identical to that described for fabricating the fan casing. Alternatively, the air inlet sleeve may be made of a metallic material, e.g. it may be made of aluminum.

As shown in FIGS. 1 and 2, the air inlet sleeve 100 is fastened to the fan casing 200 via a plurality of nut-and-bolt systems 12 that pass through the upstream flange 206 of the fan casing and through the flange 104 of the air inlet sleeve. These nut-and-bolt systems 12 are preferably regularly distributed over the entire circumference of the casing. Furthermore, they may be inserted in the flanges 104, 206 by passing them from downstream to upstream.

Furthermore, and as shown in particular in FIG. 3, means are provided for fastening pieces of equipment to the fan casing, which pieces of equipment may be removed without it being necessary beforehand to remove the air inlet sleeve.

For this purpose, the upstream flange 206 of the fan casing includes at least one setback 210 formed in a fraction of its thickness, and at least one bolt 212 for fastening pieces of equipment passing right through the flange in the axial direction.

The setback(s) 210 is/are preferably formed in an outside face of the upstream flange of the fan casing (i.e. on the upstream side thereof) so as to open out into a free end of the flange.

Each bolt 212 possesses a shank 220 and a head 214 with a flat 216 for bearing flat against a rim 218 of the corresponding setback 210. Bearing flat in this way serves to prevent the bolt from turning in the upstream flange of the fan casing. The bolt is held axially in the upstream flange of the fan casing by tightening a nut 222 on the shank 220 of the bolt. A washer 224 may be interposed between the nut 222 and the upstream flange 206 in order to avoid damaging the composite material while tightening the nut on the shank 220.

The shank 220 of the bolt 212 thus forms a stud for fastening pieces of equipment of the engine to the fan casing. In particular, the free end of the shank 220 extends beyond the upstream flange 206 of the fan casing in a downstream direction. It may be threaded in part so as to enable a piece of equipment of the engine to be fastened onto the fan casing by bolt fastening.

Unlike the nut-and-bolt systems 12, the bolts 212 for fastening pieces of equipment are preferably inserted in the upstream flange 206 of the fan casing from upstream to downstream, with this positioning needing to be done before the air inlet sleeve is mounted on the fan casing.

In an advantageous arrangement, the thickness of the setback(s) 210 formed in the upstream flange of the fan casing is substantially equal to the thickness of one layer 208 of the fiber fabric. For example, with fiber reinforcement made up of four superposed layers 208 of fiber texture, only the outer layer (i.e. the upstream layer) needs to be machined in order to form one or more setbacks therein, the other layers remaining intact.

Since each of these layers of fiber fabric typically presents a thickness of about 3 millimeters (mm), a bolt head 214 having a thickness of about 2.5 mm can be used so as to ensure that the bolts do not impede mounting the air inlet sleeve on the fan casing.

In the embodiment of FIGS. 1 and 2, each setback 210 formed in the upstream flange 206 of the fan casing is formed to receive three bolts 212 for fastening pieces of equipment.

Figure 4:
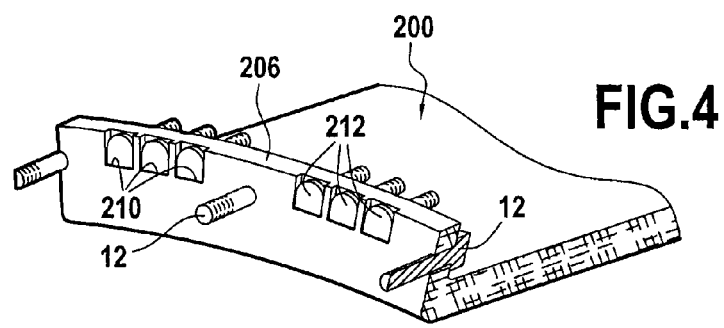
FIG. 4 shows a variant embodiment of the invention.

Naturally, a different configuration could be envisaged. Thus, in another embodiment as shown in FIG. 4, each bolt 212 for fastening pieces of equipment has its own setback 210.

Furthermore, in these two embodiments shown in FIGS. 1 to 4, the bolts 212 for fastening pieces of equipment are grouped together in threes, each group of bolts being positioned circumferentially between two nut-and-bolt systems 12. Also naturally, other arrangements could be envisaged, in particular as a function of the requirements in terms of fastening pieces of equipment on the fan casing.

What is claimed is:

1. A fan casing for a gas turbine engine, the casing having a substantially cylindrical portion that terminates at one end in an annular flange made of composite material, wherein the flange includes at least one setback in a fraction of its thickness and at least one bolt for fastening pieces of equipment passing right through the flange in the axial direction, the bolt for fastening pieces of equipment having a head that presents a flat that is to bear flat against a rim of the setback, and a shank forming a stud for fastening pieces of equipment on the casing.

2. A fan casing according to claim 1, wherein the flange is obtained from fiber reinforcement made up of at least two superposed layers of a fiber fabric, the thickness of the corresponding setback being substantially equal to the thickness of one layer of fiber fabric.

3. A fan casing according to claim 2, wherein the setback is formed in an outside face of the flange and opens out into a free end of the flange.

4. A fan casing according to claim 1, further including a nut tightened onto the shank of the bolt for fastening pieces of equipment, in order to hold the bolt on the flange.

5. A fan casing according to claim 4, further including a washer interposed between the nut and the flange.

6. A gas turbine engine casing comprising a fan casing according to claim 1 and an air inlet sleeve having a substantially cylindrical portion that terminates at one end in an annular flange, the air inlet sleeve being fastened to the fan casing via nut-and-bolt systems passing through the respective flanges of the fan casing and of the air inlet sleeve.

7. A casing according to claim 6, wherein at least the flange of the air inlet sleeve is made of composite material.

8. A casing according to claim 6, wherein the nut-and-bolt systems are circumferentially spaced apart from the bolts for fastening pieces of equipment.

9. A casing according to claim 6, wherein the nut-and-bolt systems are for inserting in the respective flanges of the fan casing and of the air inlet sleeve from downstream to upstream, and the bolts for fastening pieces of equipment are for being inserted in the flange of the fan casing from upstream to downstream.

10. A gas turbine aeroengine having a casing according to claim 6.

* * * * *